United States Patent [19]
Jacquier et al.

[11] Patent Number: 5,280,093
[45] Date of Patent: Jan. 18, 1994

[54] CHIRAL POLYMERS FOR THE SYNTHESIS OF PURE ENANTIOMERS OF AMINO ACIDS

[75] Inventors: Robert Jacquier; Monique Calmes; Jacques Daunis, all of Montpeller, France

[73] Assignee: Rhone-Poulenc Chimie, Courbevoie, France

[21] Appl. No.: 47,001

[22] Filed: Apr. 14, 1993

Related U.S. Application Data

[63] Continuation of Ser. No. 915,758, Jul. 21, 1992, abandoned, which is a continuation of Ser. No. 545,526, Jun. 29, 1990, abandoned.

[30] Foreign Application Priority Data

Jun. 29, 1989 [FR] France .................... 89/08679

[51] Int. Cl.$^5$ ............. C08F 226/00; C08F 220/36
[52] U.S. Cl. ............................ 526/263; 526/304; 526/526; 526/305; 526/306; 526/312; 526/315; 562/401; 562/445; 562/554; 562/553; 562/575; 564/302; 564/303; 564/304
[58] Field of Search .......... 526/263, 304, 305, 306, 526/312, 315

[56] References Cited

U.S. PATENT DOCUMENTS

| | | | |
|---|---|---|---|
| 4,138,542 | 2/1979 | Siegel et al. | 526/305 |
| 4,156,765 | 5/1979 | Pohlemann et al. | 526/282 |
| 4,315,089 | 2/1982 | Naarmann et al. | 526/89 |
| 4,424,312 | 1/1984 | Stille | 526/263 |
| 4,436,874 | 3/1984 | Aspisi et al. | 525/327.1 |
| 4,439,545 | 3/1984 | Aspisi et al. | 521/32 |
| 4,604,451 | 8/1986 | Harada et al. | 525/328.2 |
| 4,914,159 | 4/1990 | Bömer et al. | 525/328.2 |
| 4,931,525 | 6/1990 | Schwartz et al. | 526/305 |

FOREIGN PATENT DOCUMENTS

| | | |
|---|---|---|
| 0300448 | 1/1989 | European Pat. Off. . |
| 2515645 | 5/1983 | France . |

OTHER PUBLICATIONS

J. March, Advanced Organic Chemistry, 2nd Ed., 1977, pp. 816–819.
R. E. Dickerson and I. Geis, The Structure and Action of Proteins, p. 79: Harper & Row, New York, 1969.
V. P. Shibaev et al. (1979) J. Polym. Sci. Polym Chem Ed., 17, 1655–1670.
Calmes et al., "Supramolecular Asymmetric Induction : A New Concept Applied to the Supported Enantioselective Synthesis of α'-Amino Acids," Tetrahedron, 46:6021–6032 (1990).
"Harrap's French and English Science Dictionary," Dr. D. E. Hathway (Consultant Editor), Harrap Limited, Great Britain, 1985, p. 167.
"Organic Chemistry," Robert T. Morrison and Robert N. Boyd, Allyn and Bacon, Inc., Fifth Edition, 1987, pp. 131–132.
M. Calmes et al., "Polyacrylic Crosslinked Resins With Pendant Chirality As Auxiliary In Supported Asymmetric Synthesis," Tetrahedron Letters, Pergamon Journal, 27(36):4303–4306 (1986).
McArthur et al., "Polymer Supported Enantioselective Reactions.III. Protonation of Lithioenamine Derivatives of Racemic 2-Methylcyclohexanone," Can. J. Chem. 60:2984–45 (1982).

(List continued on next page.)

Primary Examiner—Joseph L. Schofer
Assistant Examiner—Mark Nagumo
Attorney, Agent, or Firm—Finnegan, Henderson Farabow, Garrett & Dunner

[57] ABSTRACT

The present invention relates to chiral polymers and to their uses for operations of asymmetric synthesis, deracemization and optical inversion.

These polymers are characterized in that they comprise:
  a chiral unit
  a functionalizing unit
  an optional crosslinking unit Application to chiral organic synthesis.

26 Claims, No Drawings

OTHER PUBLICATIONS

Frechet et al., "Polymer Assisted Asymmetric Reactions.II.*Synthesis and Application of a Crosslinked Resin Containing (R)-1-(4-Vinylphenyl)Ethylamine," Reactive Polymers, 227-235 (1982).

Peter Marfey, "Determination of d-Amino Acids-.II.Use of a Bifunctional Reagent, 1,5-Difluoro-2,-4-Dinitrobenzene, Carlsberg Res. Commun.", 49:591-596 (1984).

Colwell et al., "Synthesis of Carboxylic Acids and Esters Using Polymer-Bound Oxazolines," J. Org. Chem., 46:3097-3102 (1981).

Kawana et al., "Asymmetric Synthesis with Sugar Derivatives. V.[1,2]) The Synthesis of α-Hydroxy Acids on Insoluble Polymer Supports," Bull. Chem. Soc. Japan, 47:160-165 (1974).

McArthur et al., "Polymer Supported Enantioselective Reactions.II. α-Methylation of Cyclohexanone", Can. J. Chem., 60:1836-1841.

CHIRAL POLYMERS FOR THE SYNTHESIS OF PURE ENANTIOMERS OF AMINO ACIDS

This application is a continuation of application Ser. No. 07/915,758, filed Jul. 21, 1992, now abandoned, which is a continuation of application Ser. No. 07/545,526, filed Jun. 29, 1990, all abandoned.

The present invention relates to chiral polymers permitting the asymmetric synthesis, on a support, of amino acids, as well as to new processes for the synthesis of enantiomerically pure amino acids.

There are few examples in the prior art of asymmetric syntheses supported on a polymer. Their principle remains the same as in solution, requiring the presence of a chiral auxiliary in proximity to the prochiral center. Utilizing polystyrene supports in all cases, these examples relate to asymmetric syntheses of hydroxy acids (KAWANA and EMOTZ, Bull. Chem. Soc. Japan, 1974, 47, 160); of arylaliphatic esters (MCMANUS et al., J. Org. Chem. 1981, 46, 3097) and of 2-methylcyclohexanone (LEZNOFF et al., Canad. J. Chem., 1982, 60, 1836; FRECHET et al., Reactive Polymers, 1983, 1, 227). However, if the work of LEZNOFF et al. (loc. cit.) is excepted, the enantiomeric excesses remain average (56-62%). Finally, LEZNOFF et al. (Canad. J. Chem., 1982, 60, 2984) carried out the asymmetric protonation of the lithium enamine of racemic 2-methylcyclohexanone anchored to the chiral arm of a polystyrene.

Another strategy consists in utilizing a chiral polyacrylic support producing a supramolecular asymmetric induction (CALMES, DAUNIS, JACQUIER, NKUSI, VERDUCCI and VIALLEFONT, Tetrahedron Letters, 1986, 27, 4303).

However, when this strategy is applied to the synthesis of amino acids, it is necessary to work at very low temperature ($-78°$ C.).

Under these conditions, in the synthesis of amino acids, enantiomeric excesses have not exceeded 63% in alkylations of enolates carried out at $-78°$ C.

For this raason, one of the objects of the present invention is to provide a family of polymers which can be utilized for deracemizing or changing from one enantiomer to the other.

For this reason, one of the objects of the present invention is to provide a process for synthesis or deracemization utilizing the above polymers.

The subject of the present invention is a polymer which can, in particular, be obtained by the free-radical copolymerization of a chiral monomer or oligomer or prepolymer, a functionalizing agent and preferably a crosslinking agent, characterized in that it contains:
  a chiral unit
  a functionalizing unit
  an optional crosslinking unit.

The chiral unit represents, expressed in moles, a large percentage which varies according to the chemical properties of the chiral unit. When the chiral unit does not possess sites (sic) capable of forming intramolecular hydrogen bonds with another chiral unit, it is desirable that the chiral unit represents at least ½, and advantageously 70%, of the total units, and preferably ⅔. When the chiral unit possesses sites capable of forming hydrogen bonds between two chiral units, the percentage can be significantly smaller. It is, however, preferable that at least ¼, and preferably ⅓, of the units are chiral.

Although it is possible to envisage units obtained by polycondensation, such as, for example, an amide unit as in polyamides or an ester unit as in polyesters, the most suitable chiral unit is a unit which can be obtained by the polymerization of chiral monomers possessing an unsaturated bond.

The chiral monomers may be obtained by the grafting of a group bearing unsaturation onto chiral groups; for the purpose of teaching, for example, there may be mentioned:

The monomers obtained by the amidation or esterification of acrylic acids, optionally substituted, by means of optically active molecules in which the asymmetric carbon is advantageously well exposed, as in the case where the active carbon forms part of a ring.

The coupling of the chiral derivatives with the acrylic radical may be carried out by means of an amide functional group (for example with amino acids or their derivatives such as, for example, the amides and esters) or an ester functional group. It may also be carried out by any technique known to those skilled in the art, for example vinyl groups may be grafted onto the aromatic rings of chiral derivatives possessing the latter, such as, for example, derivatives of phenylalanine and tryptophan and adrenaline derivatives and the like.

The chiral monomer may also be obtained by reciprocal coupling systems, such as, for example, the manufacture of enol esters from optically active acids such as amino acids, or of enol ether from an alcohol possessing an active group. It is also possible to utilize compounds possessing asymmetric carbons and a polymerizable double bond, after optical resolution where appropriate.

It is preferable that, in the chiral monomer generating the chiral unit, the double bond is close to the asymmetric carbon, more specifically it is preferable that the number of atoms between the double bond and the chiral center is at most equal to 5, preferably to 3 and most preferably to 2.

Moreover, the chiral unit advantageously possesses at least one functional group bearing hydrogen capable of forming hydrogen bonds with another chiral unit of the same kind. Among functional groups, acidic functional groups, alcohol functional groups including phenols, amide functional groups and amine functional groups may be mentioned.

Among chiral units usually employed, there may be mentioned, by way of examples, the acrylamides, optionally substituted at the acryl group, formed from the following amines:
prolinol, and optionally its derivatives in the form of esters or ethers of the alcohol functional group,
1-amino-1-phenylethanes, in particular 1-(N-methylamino)-1-phenylethane,
1-(N-alkylamino)-2-alkoxypropane in which the alkyl or alkoxy groups can represent linear or branched alkyls, preferably a methyl or a hydrogen,
1-pyrrolidinyl-2-methylpyrrolidine,
1-amino-1-alkyl-2-hyiroxyethane and its derivatives mono- or dimethylated on the nitrogen and on the alcohol. The derivative disubstituted on the nitrogen naturally being excluded since it is incapable of forming an amide bond with the acryl group (however it could be used if an acrylic ester is utilized as a chiral monomer).

Generally speaking, it is preferable that the chiral monomer generating the chiral unit is of low molecular weight, that is to say advantageously at most equal to 200, and preferably at most equal to approximately 150.

The functionalizing unit can be any unit bearing protective functions as defined in works well known to those skilled in the art, such as the work by Theodore W. Greene "Protective Groups in Organic Synthesis" published by John WILEY and SONS, 1981, and that by J.F.W. McOmie, "Protective Groups in Organic Chemistry" published by PLENUM PRESS, LONDON AND NEW YORK, 1973.

The protective groups may be converted to monomers giving functionalizing units in the same manner, when the appropriate changes are made, as in the case of the monomers and the chiral units. Thus, anilide groups converted to acrylanilides bearing said protective groups as defined above may be used as monomers generating the functionalizing units. Among protective groups giving the best results, aminobenzaldehyde derivatives, which are especially useful in the synthesis or deracemization of (primary) amino derivatives such as amino acids, may be mentioned.

Acryloyl derivatives (including methacryloyl derivatives), the derivatives derived by amidation with acrylic acids of the following derivatives:

$$CH_3-NH-C(R_1)(R_2)-CHO$$

with $R_1$ or $R_2$ aryl or aralkyl, may be mentioned.

It is also possible to devise the situation where the functionalizing units are units derived from the polymerization of chiral units of the above type, but onto which the envisaged protective function has been grafted.

It is very highly preferable that the polymer according to the present invention also contains crosslinking units. These crossbonding units are derived from monomers in general bearing 2 unsaturated bonds. These monomers are well known to those skilled in the art in the polymer field. Diesters or diamides of acrylic acids, obtained by the action of acrylating reagents on dialcohols or diamides, may be utilized in particular.

The different monomers are selected according to techniques well known to those skilled in the art so as to be compatible for the purpose of a smooth polymerization. The polymerization is not the only criterion; it is also advisable that the monomers do not interact with one another from a chemical standpoint. The molar percentage of the crosslinking agent is advantageously between 0 and 20% of the chiral unit, and preferably from 5 to 15, the functionalizing unit constituting the remainder of this functionalized chiral polymer.

Sequences of chiral monomer may be inserted into a non-chiral polymer.

The different monomers are selected in such a way that the mass ratios, compatible with the mole ratios given above, are advantageously between 50 and 65% for the chiral unit, between 5 and 15% by weight for the crosslinking unit and between 40 and 25% for the functionalizing unit.

The synthesis of the polymers according to the present invention is carried out according to techniques well known to those skilled in the art. Those which form the subject of Examples 1 to 3 may be taken as a paradigm.

The chiral polymers according to the present invention permit asymmetric synthesis, deracemization and optical inversion. The optical isomer obtained depends on the choice of the R or S form of the chiral monomer.

In the description which follows, the reactions of asymmetric synthesis and optical inversion will be utilized on amino acids as a paradigm of what it is possible to carry out by means of the monomer according to the present invention. In effect, the syntheses described below are well known to those skilled in the art, and have been described and exemplified numerous times in the scientific literature. The invention consists in carrying out the reactions of synthesis, inversion or racemization on the polymer according to the present invention, thereby enabling pure optically active compounds to be obtained and permitting deracemization or inversion according to techniques which usually permit racemization.

The subject of the present invention is, in addition, a process for the asymmetric synthesis, on a support, of amino acids from a prochiral derivative of general formula:

$$H_2N-\overset{R_1}{\underset{|}{C}}H(CH_2)_nCOOR_2 \qquad (I)$$

in which n is equal to 0 or 1.

$R_1$ represents a hydrogen atom or an alkyl or aralkyl group, and $R_2$ represents a linear or branched $C_1$ to $C_5$ alkyl group or an aryl group, which derivative is reversibly anchored, for example by the formation of a Schiff's base, to a chiral polymer functionalized with an aldehyde or the like, characterized in that:

in a first step, the derivative bonded to the chiral polymer is deprotonated with a strong base in a solvent, preferably aprotic and preferably polar, such as, for example, tetrahydrofuran;

in a second step, either alkylation or protonation of the deprotonated derivative bonded to the chiral polymer is performed, so as to create or recreate an asymmetric carbon on said derivative, and in a third step, the Schiff's base is hydrolyzed to obtain an amino acid of general formula:

$$H_2N-\overset{R_1}{\underset{\underset{R_3}{|}}{C}}-(CH_2)_n-COOH \qquad (II)$$

where $R_1$ and n are as defined above, and $R_3$ represents an alkyl or aralkyl group, $R_1$ and $R_3$ necessarily being different.

As a strong base, amides such as lithium diisopropylamide or lithium tetramethylpiperide, the lithium salt of hexamethyldisilazane, anions derived from alkanes, such as butyllithium, and alcoholates such as potassium tert-butylate. This list is not exhaustive.

According to a preferred embodiment of the process according to the present invention, protonation of the deprotonated derivative bonded to the chiral polymer is performed by adding water, an alcohol or an inorganic or organic acid.

According to a preferred embodiment of the process according to the present invention, alkylation of the deprotonated derivative bonded to the chiral polymer is performed with a halide of general formula $R_3X$, where X represents Cl, Br or I and $R_3$ is as defined above. $R_3$ can also be a functionalized group of the type $$Z-(CH_2)_n-$$

in which n=1 to 4

Z=I, CN, CO$_2$R$^4$ (R$^4$=alkyl), OR$^5$ (R$^5$=CH$_3$, tosyl, tetrahydropyranyl), Y—NH (Y=benzyloxycarbonyl, t-butyloxycarbonyl), R$^4$S,

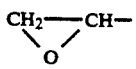

The deprotonated derivative bonded to the chiral polymer can also react:

in aldolization and ketolization reactions with R$^6$CHO (R$^6$=alkyl, aryl or aralkyl) and with aliphatic or arylaliphatic ketones, in 1,4-addition reactions with acrylic esters, acrylonitrile or acrolein.

According to an especially advantageous arrangement of this preferred embodiment of the process according to the present invention, the deprotonated derivative bonded to the chiral polymer is reacted with the halide R$_3$X for 1h to 4h.

To obtain, by the process according to the present invention, one or other of the two enantiomers of an amino acid, with an enantiomeric excess of more than 95%, the chiral polymer containing one of the two isomers, R or S, of N-acryloylprolinol is selected, according to the enantiomer desired.

In addition, by means of the use of a new support polymer in which the chiral bond is N-acryloylprolinol, it is possible to equilibrate the intermediate enolates without the need to work at low temperature.

The result of this is that, in contrast to the processes described in the prior art, which can be carried out only at very low temperatures, of the order of −70° to −80° C., the process according to the present invention may be carried out entirely at room temperature, and that it is even possible, surprisingly, to improve its outcome by a step of heating to moderate temperature, of the order of 60° to 70° C.

According to a preferred embodiment of the process according to the present invention, the asymmetric synthesis of amino acids on a support is performed at a temperature above 0° C.

According to another preferred embodiment of the process according to the invention, the derivative bonded to the polymer is heated to the refluxing temperature of tetrahydrofuran (67° C.) at the end of the first step for a period of 15 min to 4h.

Apart from the foregoing arrangements, the invention also comprises other arrangements which will become apparent from the description which follows.

The present invention will be better understood by means of the further description below, which relates to examples of preparation of the chiral support polymer, and to examples of embodiments of the process for the asymmetric synthesis of amino acids according to the present invention.

It should be clearly understood, however, that these examples are given only by way of illustration of the subject of the invention, and in no way constitute a limitation of the latter.

The enantiomeric excesses (ee) are determined either by measurement of the optical rotations, or preferably using Marfey's reagent (Carlsberg Res. Comm., 1984, 49, 591) which permits separation of the diastereoisomers by reversed-phase HPLC with excellent precision.

I—PREPARATION OF A CHIRAL SUPPORT POLYMER

Example 1

10.1 g (0.065 mole) of (R)- or (S)-N-acryloylprolinol, 1.3 g of bis(acryloyl)-N,N'-dimethylethylenediamine and 3.6 g (0.019 mole) of N-acryloyl-N-methyl-p-aminobenzaldehyde are added to 30 ml of tetrahydrofuran, followed by the addition of 1.5 g of azoisobutyronitrile. The mixture is heated for 1 h to reflux, cooled to room temperature and filtered. The product is washed successively with EtOH+10% of ether and with CH$_2$Cl$_2$+10% of ether. The residue is suspended in 50 ml of ether and the lumps are broken up with a spatula. The product is filtered off and dried under vacuum over P$_2$O$_5$ at room temperature. It is sieved between 0.08 mm and 0.2 mm. Yield 90–95%.

The load, measured by oxime formation, is 1.1 meq CHO per gram.

Example 2

The same quantities of the three monomers utilized in Example 1 are dissolved in a 1:1 mixture of alcohol and water. After degassing with a sonic probe, a stream of nitrogen is bubbled through for 15 min. A solution of 0.3 g of ammonium persulfate in 1 ml of water is then added, followed, after homogenization, by the addition of 0.3 ml of tetramethylethylenediamine. The mixture is homogenized and, after a few minutes, the temperature rises by 4° to 7° C.

The mixture is left for 1 h and filtered and the product is washed with acetone and alcohol. The resin is suspended in ether and the procedure is as in Example 1. Yield 90–95% after sieving. Load identical to that of Example 1.

Example 3

Paraffin oil (400 ml) and sorbitane trioleate (Fluka SPAN ® 85) (0.3 ml) are introduced into a 2-1 cylindrical reactor equipped with a stirrer and a nitrogen inlet. A strong stream of nitrogen is bubbled through for 30 minutes before the introduction of (R)- or (S)-N-acryloylprolinol (0.12 mole), bis(acryloyl)-N,N'-dimethylethylenediamine (0.013 mole) and N-acryloyl-N-methyl-p-aminobenzaldehyde (0.035 mole), these compounds being diluted in water (110 ml) and ethanol or dimethylformamide (110 ml). The mixture is stirred under a slow stream of nitrogen and the stirrer speed is adjusted until the suspended drops reach a diameter in the region of 0.1 mm. A solution of 0.5 g of ammonium persulfate in 1 ml of water is then added, followed by the addition of 0.36 ml of tetramethylethylenediamine. After a short induction period, the temperature rises to around 30° C. After 30 min, the mixture is diluted with petroleum ether. The polymer beads are collected on a Buchner covered with a nylon mesh (100 um), washed copiously successively with petroleum ether, acetone, aqueous acetone (1:1), water, ethanol and ether and finally dried under vacuum over P$_2$O$_5$ at room temperature. Yield 90–95% of resin beads (diameter between 0.1 and 0.2 mm). Load identical to that of Example 1.

II ASYMMETRIC SYNTHESIS OF AMINO ACIDS

Example 4

10 g of copolymer obtained in Examples 1, 2 or 3 from (S)-prolinol and 2.9 g of racemic t-butyl alaninate in 150 ml of toluene and a few drops of boron trifluoride etherate are heated to reflux, removing the water formed by means of a Dean and Stark trap. When the reaction is complete, the mixture is allowed to return to room temperature and the resin is filtered off, washed with dichloromethane and ether and dried under vacuum over $P_2O_5$ at room temperature.

To a stirred suspension of the Schiff's base thereby obtained, in 200 ml of anhydrous tetrahydrofuran, a solution of lithium diisopropylamide (50 moles) in 90 ml of tetrahydrofuran is added at room temperature. The mixture is heated for 2 h under reflux and cooled to 20° C., 40 ml of water are added and the mixture is left for 2 h. The resin is then filtered off and copiously washed successively with tetrahydrofuran, dichloromethane and anhydrous ether.

A suspension of the above resin in 200 ml of 1.5 N hydrochloric acid is stirred for 4 h at room temperature. The solid is filtered off and washed with 200 ml of water, and the filtrates are combined and concentrated to dryness under vacuum.

The residue of amino acid hydrochloride is stirred for 1 h with 10 ml of hexamethyldisilazane. The insoluble matter is filtered off and 20 ml of methanol are added to the filtrate; after 10 min, the solvent is evaporated off and the residue of (R)-alanine is dried under vacuum. Yield 95–97%; enantiomeric excess (determined by polarimetry) 96–98%.

The recovered resin can be recycled after drying.

Example 5

The same operation as in Example 4 is carried out with a polymer prepared from (R)-prolinol. (S)-Alanine is obtained with the same chemical yield and the same enantioselectivity.

Example 6

The same procedure as in Example 4 is carried out, but the whole deprotonation and reprotonation reaction is performed at −78° C. (R)-Aniline is obtained with an ee=61%.

Example 7

The same operation as in Example 4 is carried out, but starting with t-butyl (RS)-valinate. (R)-Valine is obtained with a 95–97% yield and an ee =98–99%.

Example 8

Same operation as in Example 4, but the supported Schiff's base is prepared from t-butyl glycinate. After formation of the enolate by the action of lithium diisopropylamide in tetrahydrofuran at 20°, the mixture is heated for 2 h under reflux and cooled to 20°, 15 moles of methyl iodide in 10 ml of tetrahydrofuran are added dropwise and the mixture is left for 2 h.

After treatment as described in Example 4, (S)-alanine is isolated with a 95–97% yield and an ee=98–99%.

Example 9

Same procedure as in Example 8, utilizing a copolymer prepared from (R)-prolinol. Under these conditions, (R)-alanine is isolated with the same yield and the same enantioselectivity as in Example 8.

Example 10

Same procedure as in Example 8, but avoiding bringing the enolate to reflux. (S)-Alanine is obtained with an ee=82%.

In each of the processes illustrated by the examples above, around ten recyclings of the polymer were carried out without loss of yield or of enantio-selectivity.

As is apparent from the foregoing, the invention is in no way limited to those of its embodiments and methods of implementation and application which have just been described more explicitly; it encompasses, on the contrary, all variants which may occur to the specialist in the field, without falling outside the scope or the range of the present invention.

Example 11

The same operation as in Examples 4 and 7 is carried out starting with t-butyl (RS)-phenylalaninate. (R)-Phenylalanine is obtained with a 95–97% yield and an ee>99%.

Example 12

The same operation as in Example 8 is carried out, but replacing methyl iodide by isopropyl iodide.

After treatment as described, (S)-valine is isolated with a 95–97% yield and an ee>99%.

Example 13

The same operation as in Example 8 is carried out, but replacing methyl iodide by benzyl bromide. (S)-Phenylalanine (sic) is isolated with a 95–97% yield and an ee>99%.

Example 14

The same operation as in Example 4 is carried out, but starting with t-butyl (S)-alaninate. (R)-Alanine is obtained with a quantitative yield and with an ee>99%.

Example 15

The same operation as in Example 4 is carried out, but utilizing the N-acryloyl derivative of (R)-methylbenzylamine as a bond agent. Utilizing 5 equivalents of LDA, (R)-alanine is isolated with a 95% yield and an ee=86%. The ee falls to 37% if 1 equivalent of LDA is employed.

What is claimed is:

1. Polymer obtained by copolymerization of at least one chiral unit and at least one functionalizing agent having a protective function, each chiral unit being a chiral monomer selected from one of two stereoisomers, R and S, having a chiral carbon, a molecular weight equal to at most 200, and possessing a polymerizable double bond with the number of atoms between said double bond and said chiral carbon being at most 5, said polymerization taking place through said double bond of said chiral monomer, wherein said chiral unit represents, expressed in moles, a ratio at least equal to one-half of said polymer; wherein, if two or more chiral units are copolymerized with said functionalizing agent, substantially all of the chiral units are of the same configuration, either R or S; wherein said functionalizing agent comprises an aromatic aldehyde group; and wherein said functionalizing agent comprises said chiral monomer and a protective group, with the proviso that the chiral monomer is other than 1-acryloyl-2-methoxymethylpyrrolidine.

2. Polymer according to claim 1 wherein said polymer includes a crosslinking agent.

3. Polymer according to claim 1, wherein said chiral unit represents, expressed in moles, a ratio equal to at least two-thirds of said polymer.

4. Polymer according to claim 1, wherein said chiral unit represents, expressed in moles, a percentage equal to at least 70% of said polymer.

5. Polymer according to claim 1, characterized in that said chiral unit represents, expressed in moles, a ratio equal to at least three-fourths of said polymer.

6. Polymer according to claim 1, wherein said chiral unit comprises at least one functional group capable of forming a hydrogen bond with a second identical chiral unit.

7. Polymer according to claim 6, wherein said functional group capable of forming a hydrogen bond is an acidic, alcohol, amide, or amine functional group.

8. Polymer according to claim 6, wherein said functional group capable of forming a hydrogen bond is an alcohol functional group.

9. Polymer according to claim 1, wherein said aromatic aldehyde group is a benzaldehyde roup.

10. Polymer according to claim 1, wherein said aromatic aldehyde group is an aminobenzaldehyde group.

11. Polymer obtained by copolymerization of at least one chiral unit and at least one functionalizing agent having a protective function, each chiral unit being a chiral monomer selected from one of two stereoisomers, R and S, having a chiral carbon, a molecular weight equal to at most 200, and possessing a polymerizable double bond with the number of atoms between said double bond and said chiral carbon being at most 5, said polymerization taking place through said double bond of said chiral monomer; wherein said chiral unit comprises at least one functional group capable of forming a hydrogen bond with a second identical chiral unit; wherein, if two or more chiral units are copolymerized with said functionalizing agent, substantially all of the chiral units are of the same configuration, either R or S; wherein said functionalizing agent comprises an aromatic aldehyde group; and wherein said functionalizing agent is a monomer which does not comprise said chiral monomer, with the proviso that the chiral monomer is other than 1-acryloyl-2-methoxymethyl-pyrrolidine.

12. Polymer according to claim 11, wherein said polymer includes a crosslinking agent.

13. Polymer according to claim 11, wherein said chiral unit represents, expressed in moles, a ratio equal to at least one-half of said polymer.

14. Polymer according to claim 11, wherein said chiral unit represents, expressed in moles, a ratio equal to at least two-thirds of said polymer.

15. Polymer according to claim 11, wherein said chiral unit represents, expressed in moles, a ratio equal to at least three-fourths of said polymer.

16. Polymer according to claim 11, wherein said chiral unit is a chiral monomer selected from one of two stereoisomers, R and S, of N-acryloyl-prolinol, wherein said functionalizing agent is para-(N-acryloyl-N-methylamino)benzaldehyde, and wherein one or more of the acryloyl groups is optionally replaced, either in the chiral unit or in the functionalizing agent, by a methacryloyl group.

17. Polymer according to claim 16, wherein none of the acryloyl groups is optionally replaced by a methacryloyl group.

18. Polymer according to claim 16, wherein said polymer includes a crosslinking agent.

19. Polymer according to claim 18, wherein said crosslinking agent is selected from the group consisting of bis(acryloyl)-N,N'-dimethylethylenediamine and bis-(acryloyl)piperizine, wherein any acryloyl group may be replaced by a methacryloyl group.

20. Polymer according to claim 19, wherein the acryloyl group of the crosslinking agent is replaced by a methacryloyl group.

21. Polymer according to claim 19, wherein said crosslinking agent is bis(acryloyl)-N,N'-dimethylethylenediamine.

22. Polymer according to claim 11, wherein said functional group capable of forming a hydrogen bond is an acidic, alcohol, amide, or amine functional group.

23. Polymer according to claim 11, wherein said functional group capable of forming a hydrogen bond is an alcohol functional group.

24. Polymer according to claim 11, wherein said aromatic aldehyde group is a benzaldehyde group.

25. Polymer according to claim 11, wherein said aromatic aldehyde group is an aminobenzaldehyde group.

26. Polymer according to claim 11, wherein said functionalizing agent is para-(N-acryloyl-N-methylamino)benzaldehyde.

* * * * *